March 22, 1932.　　C. R. KADDELAND　　1,850,720
SLITTING AND COLLECTING MECHANISM
Filed April 5, 1929　　12 Sheets-Sheet 1
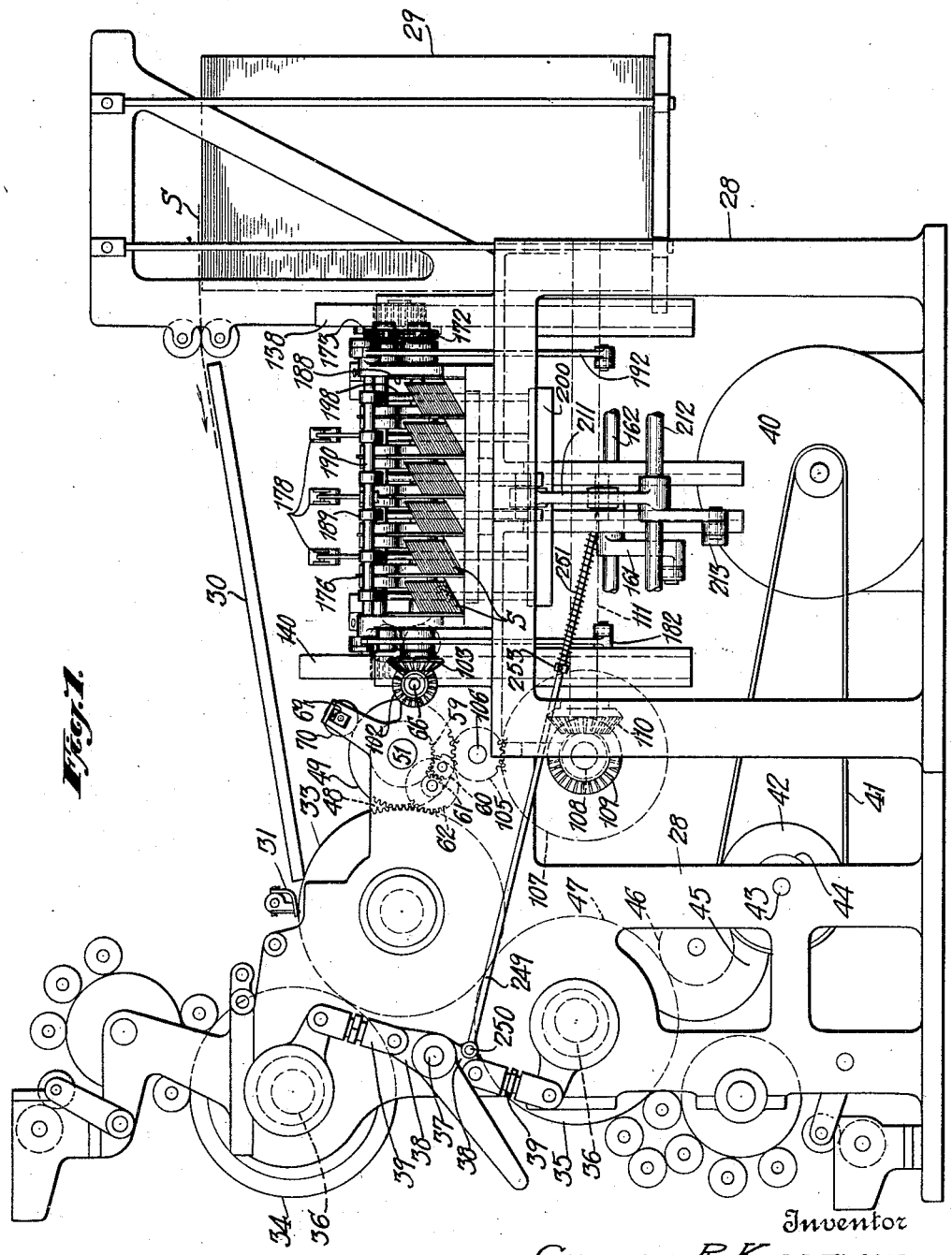
Inventor
CHRISTEN R. KADDELAND.
By His Attorney
Philip C. Peck

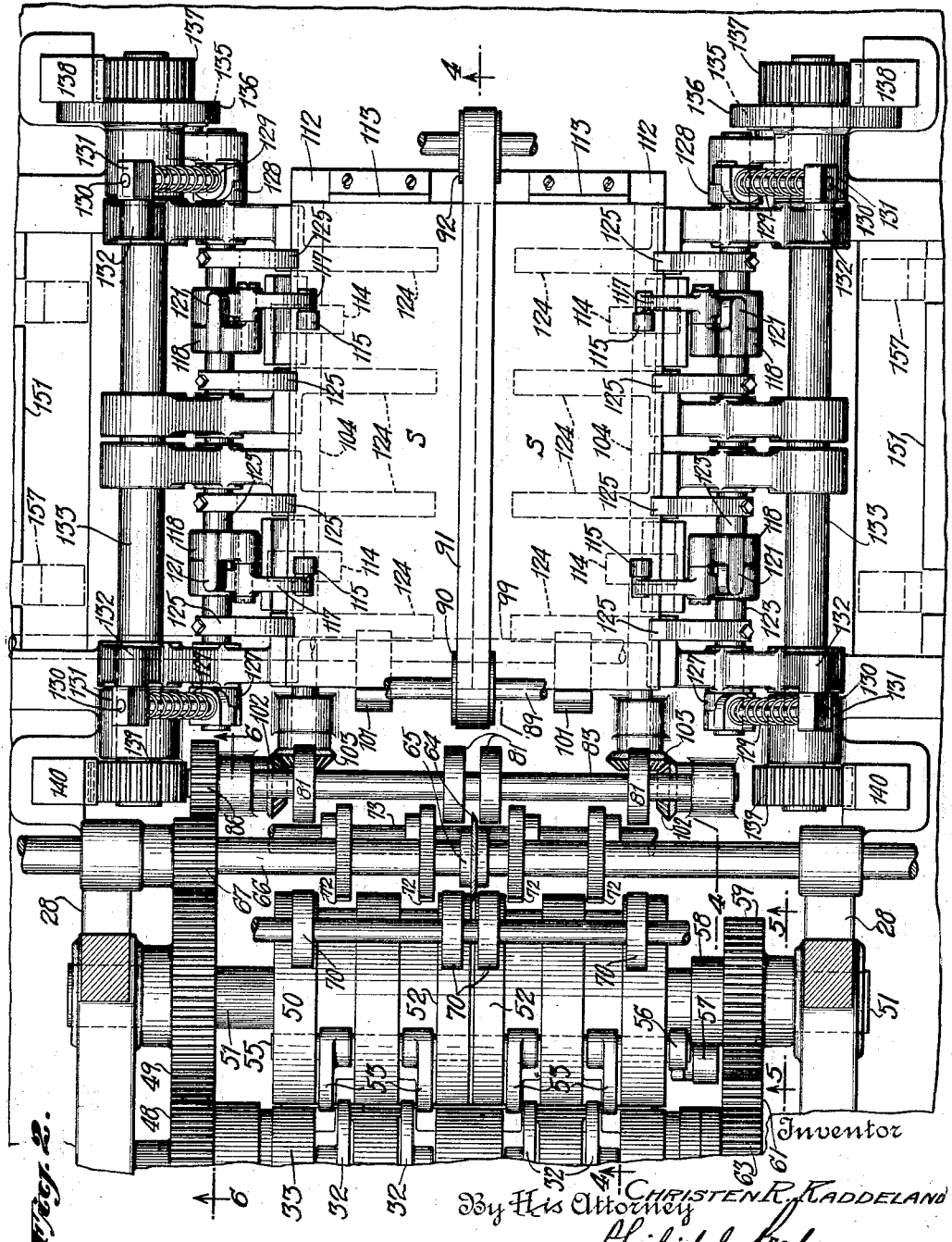

March 22, 1932. C. R. KADDELAND 1,850,720
SLITTING AND COLLECTING MECHANISM
Filed April 5, 1929 12 Sheets-Sheet 3
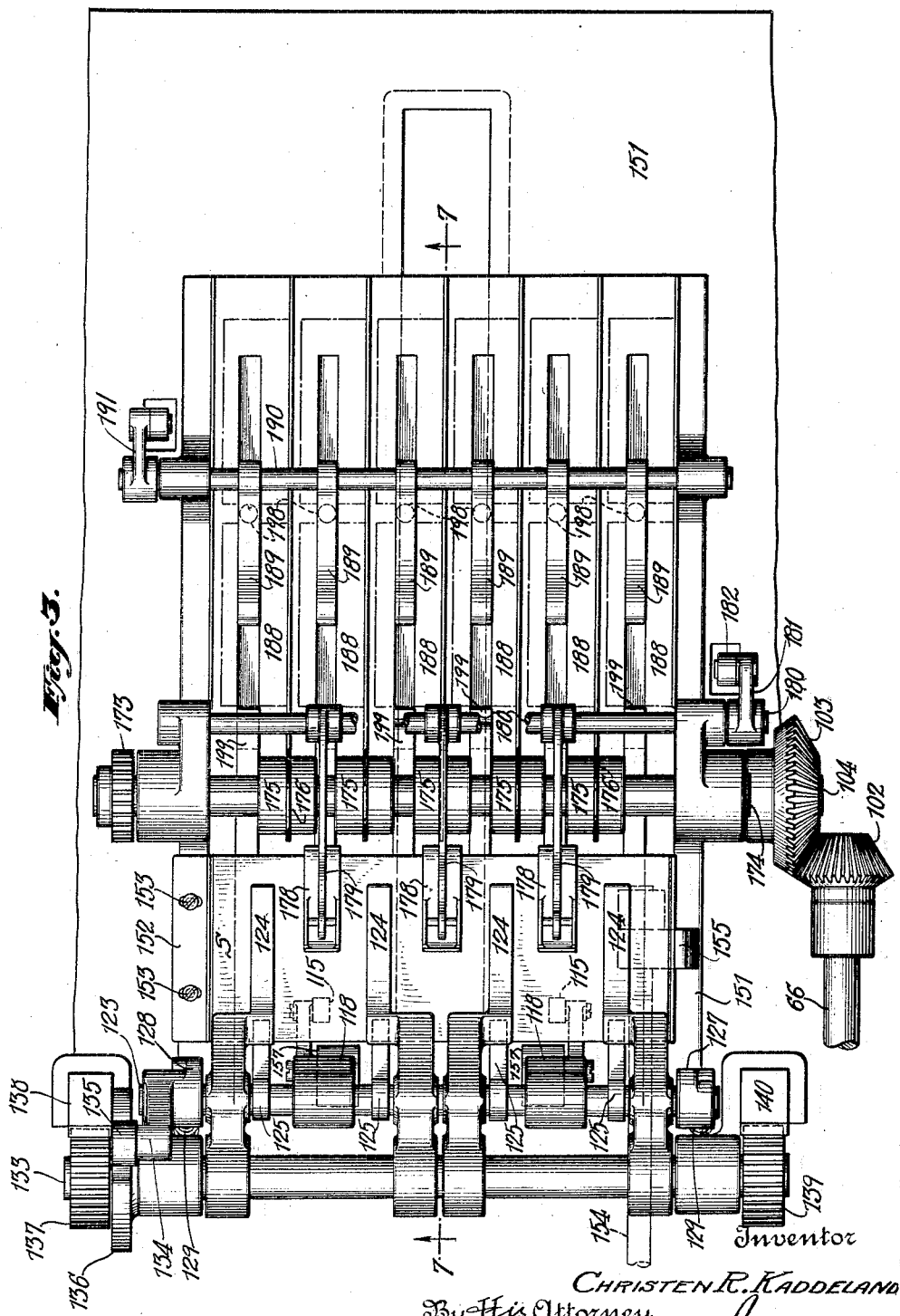
Inventor
CHRISTEN R. KADDELAND
By His Attorney

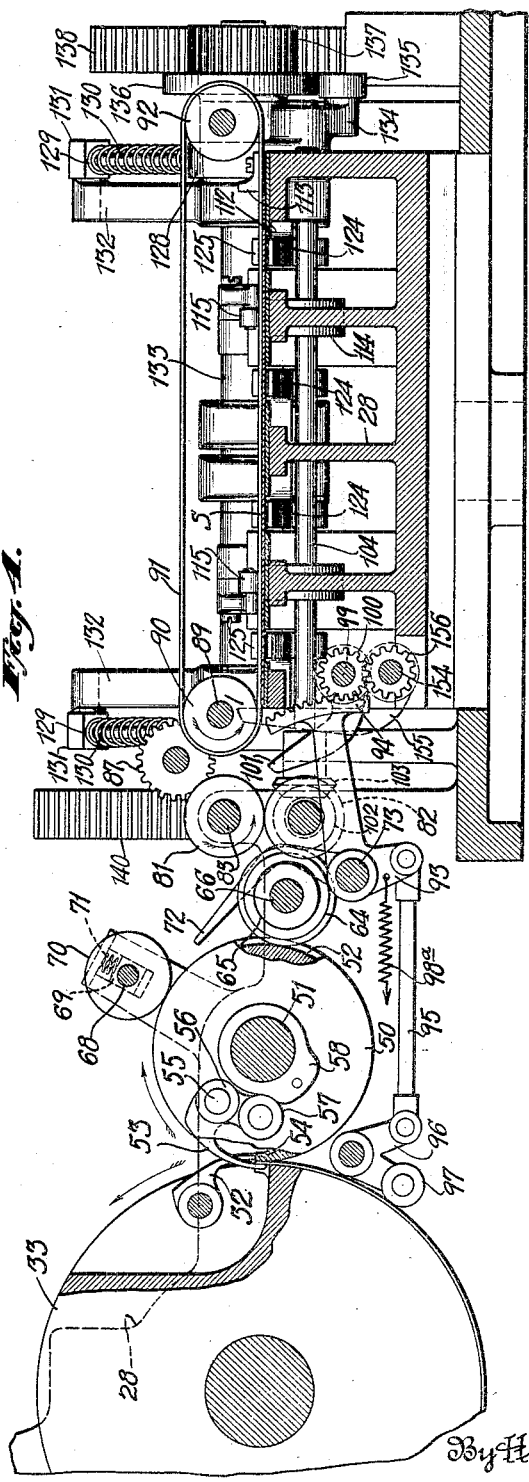
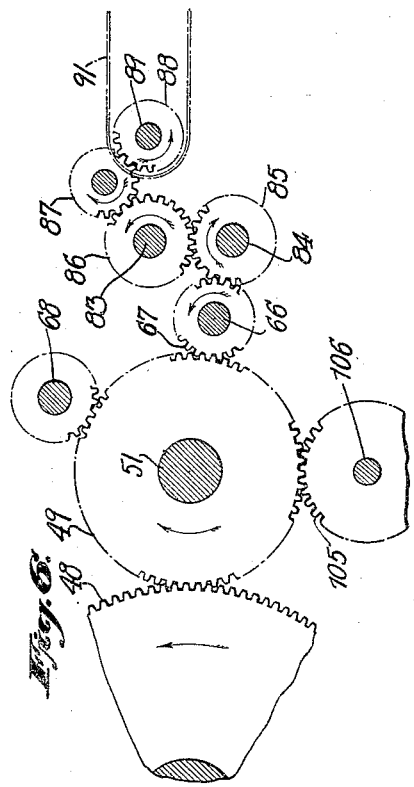
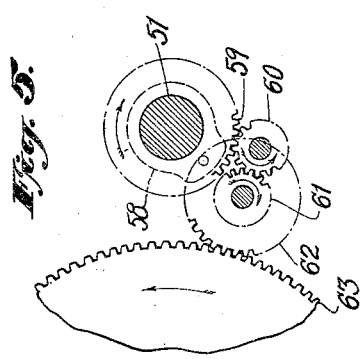

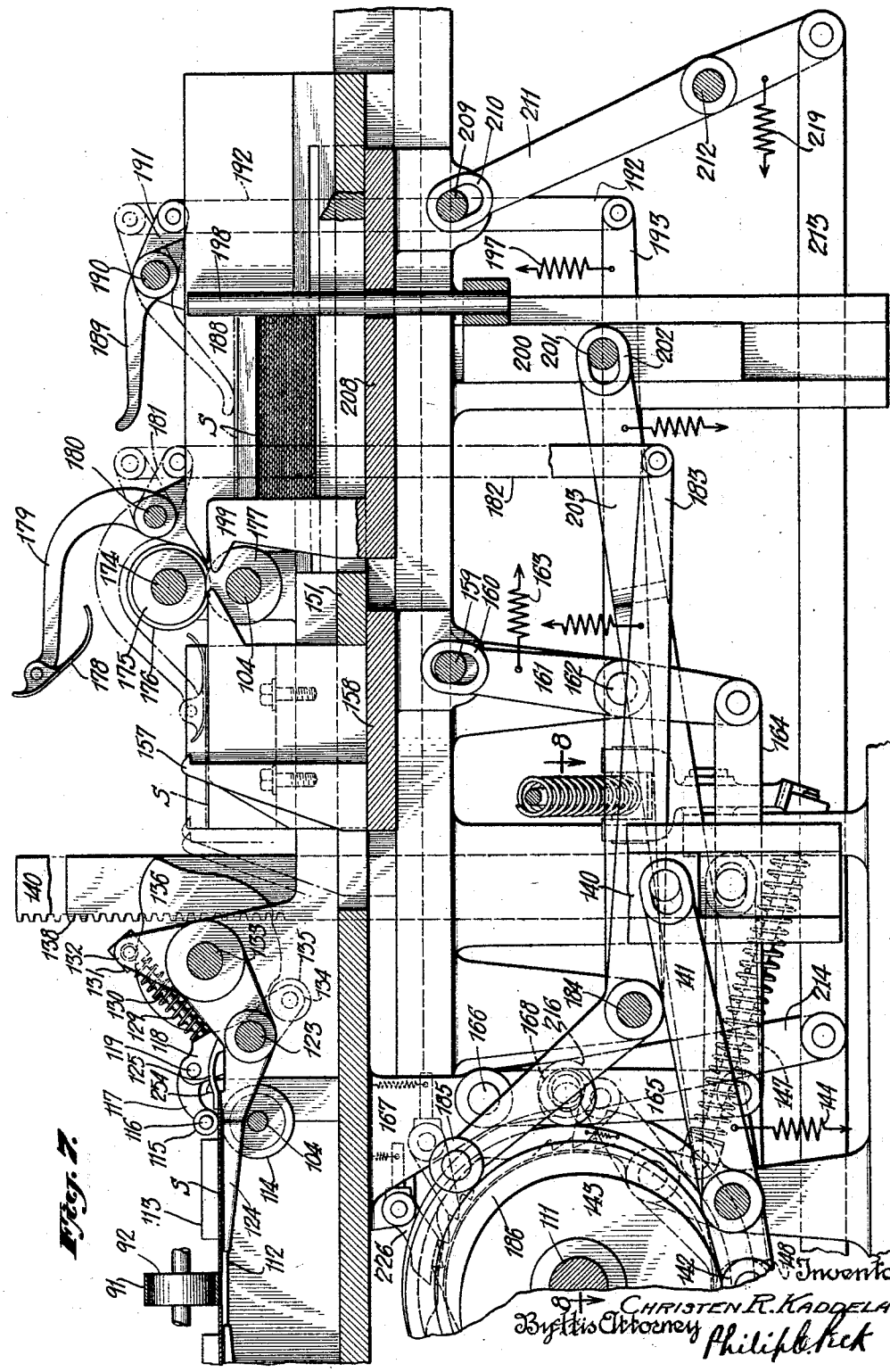

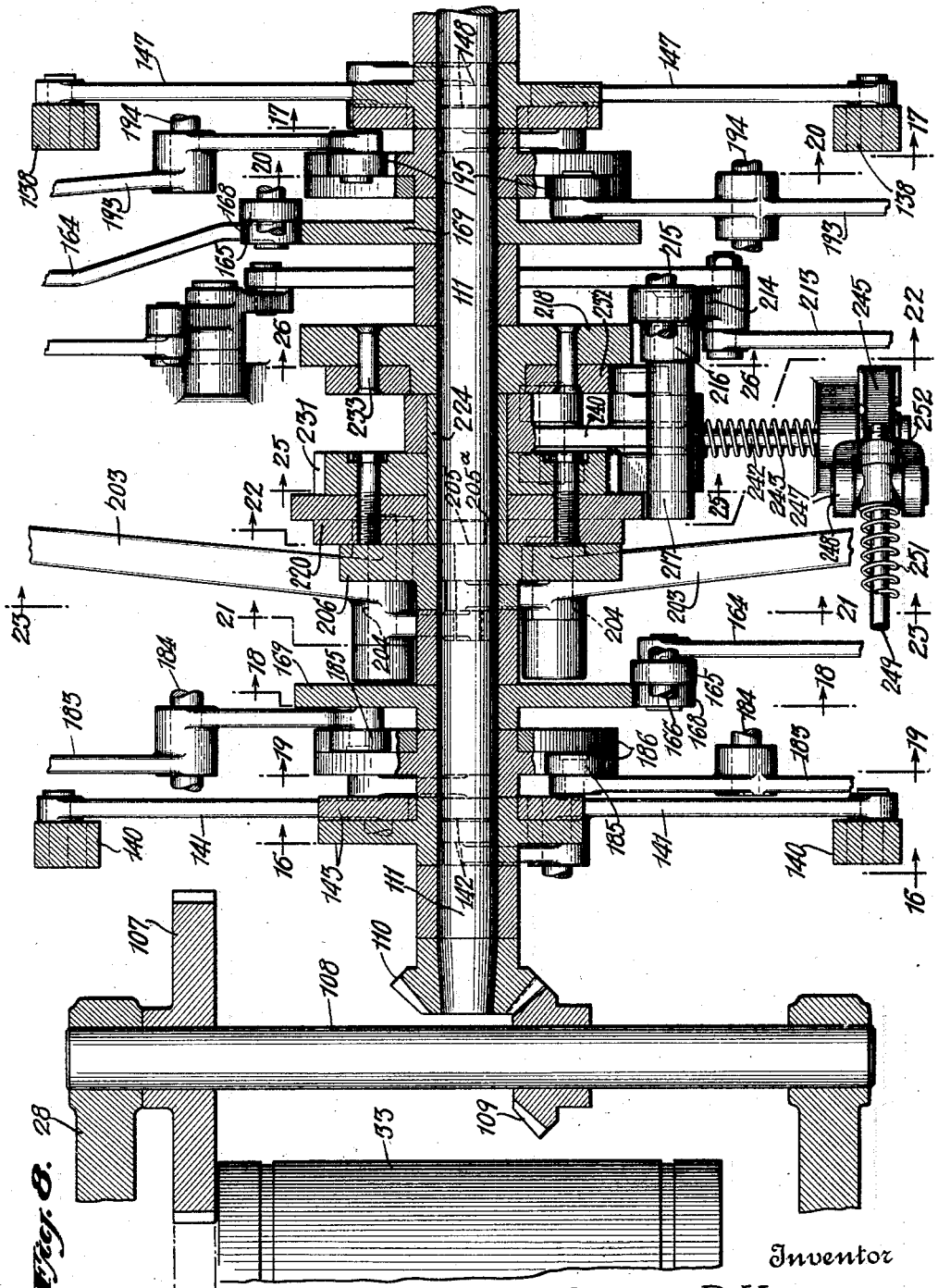

March 22, 1932.  C. R. KADDELAND  1,850,720
SLITTING AND COLLECTING MECHANISM
Filed April 5, 1929   12 Sheets-Sheet 7
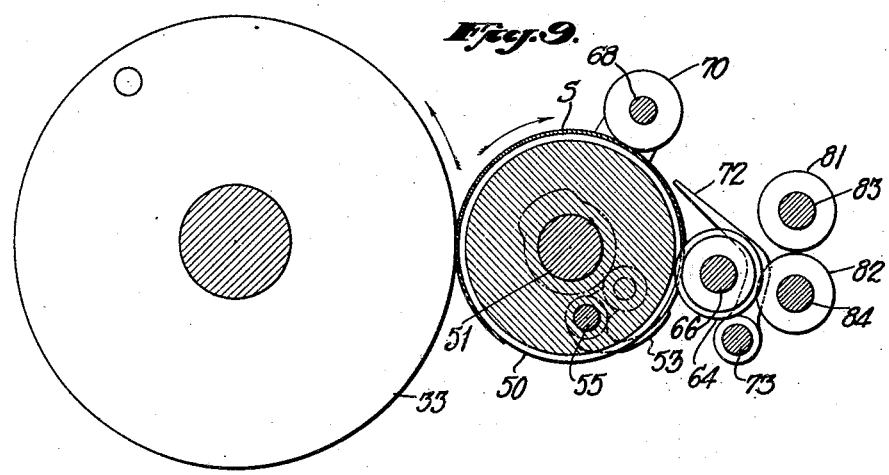
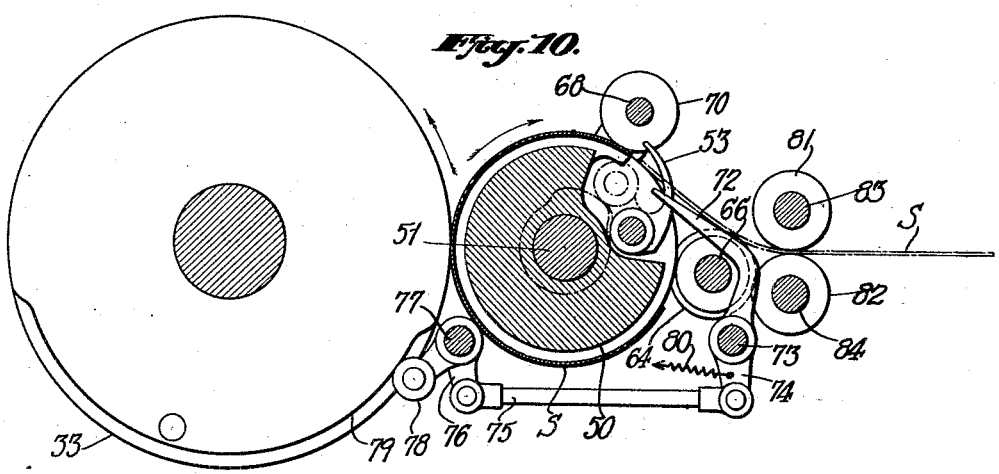
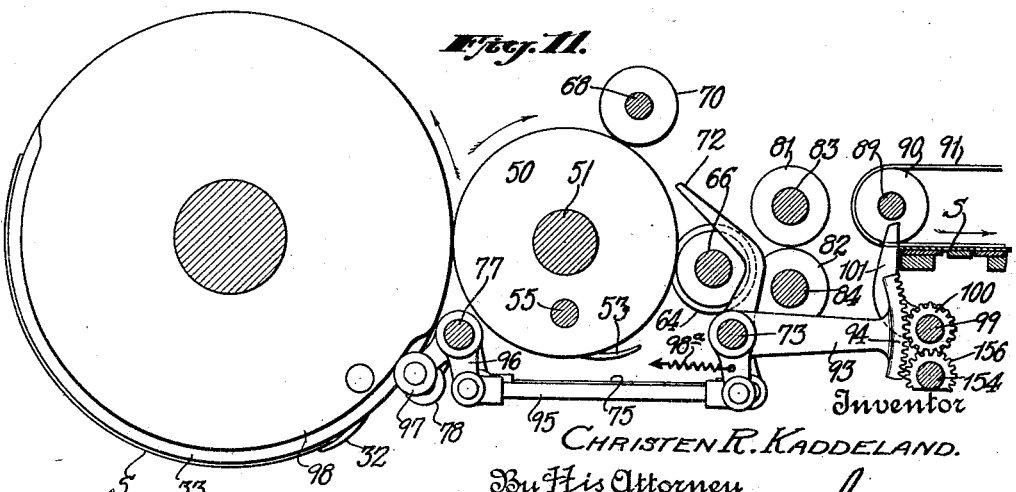

March 22, 1932. C. R. KADDELAND 1,850,720
SLITTING AND COLLECTING MECHANISM
Filed April 5, 1929 12 Sheets-Sheet 8
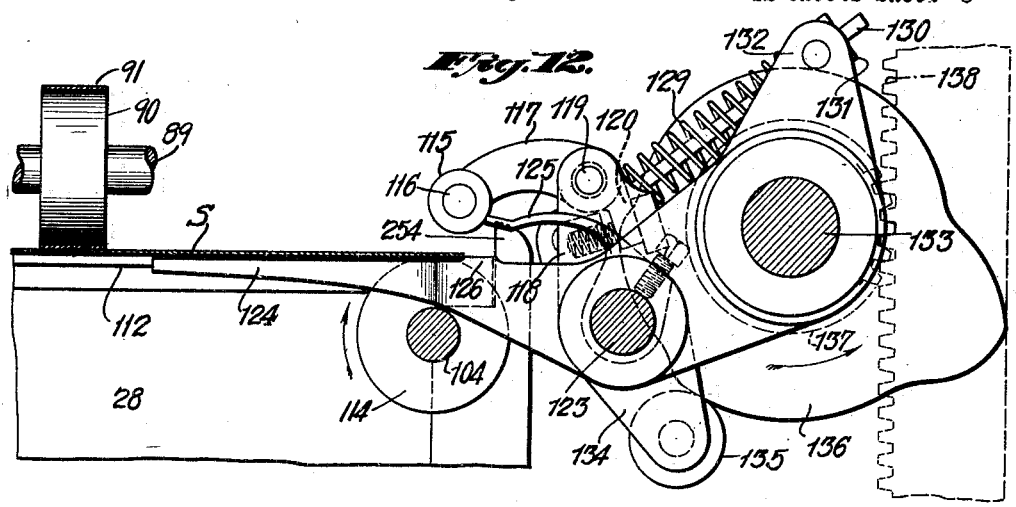
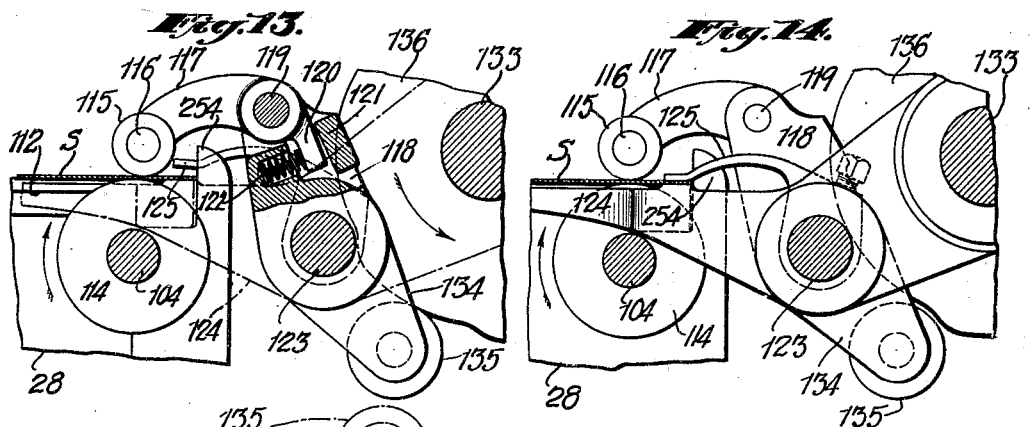
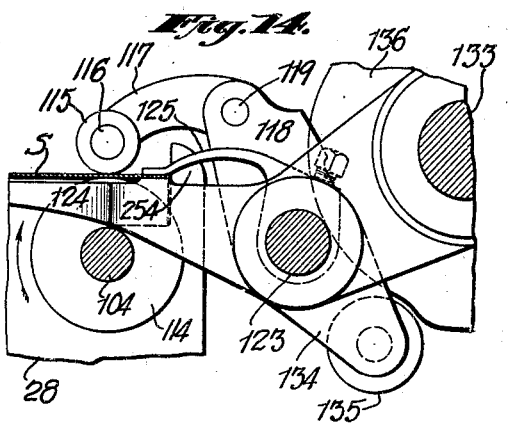
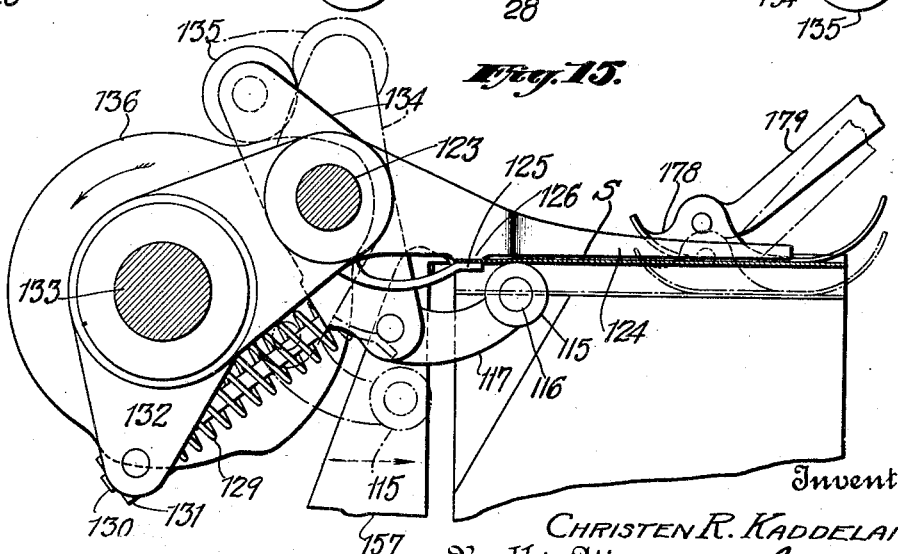
Inventor
CHRISTEN R. KADDELAND.
By His Attorney

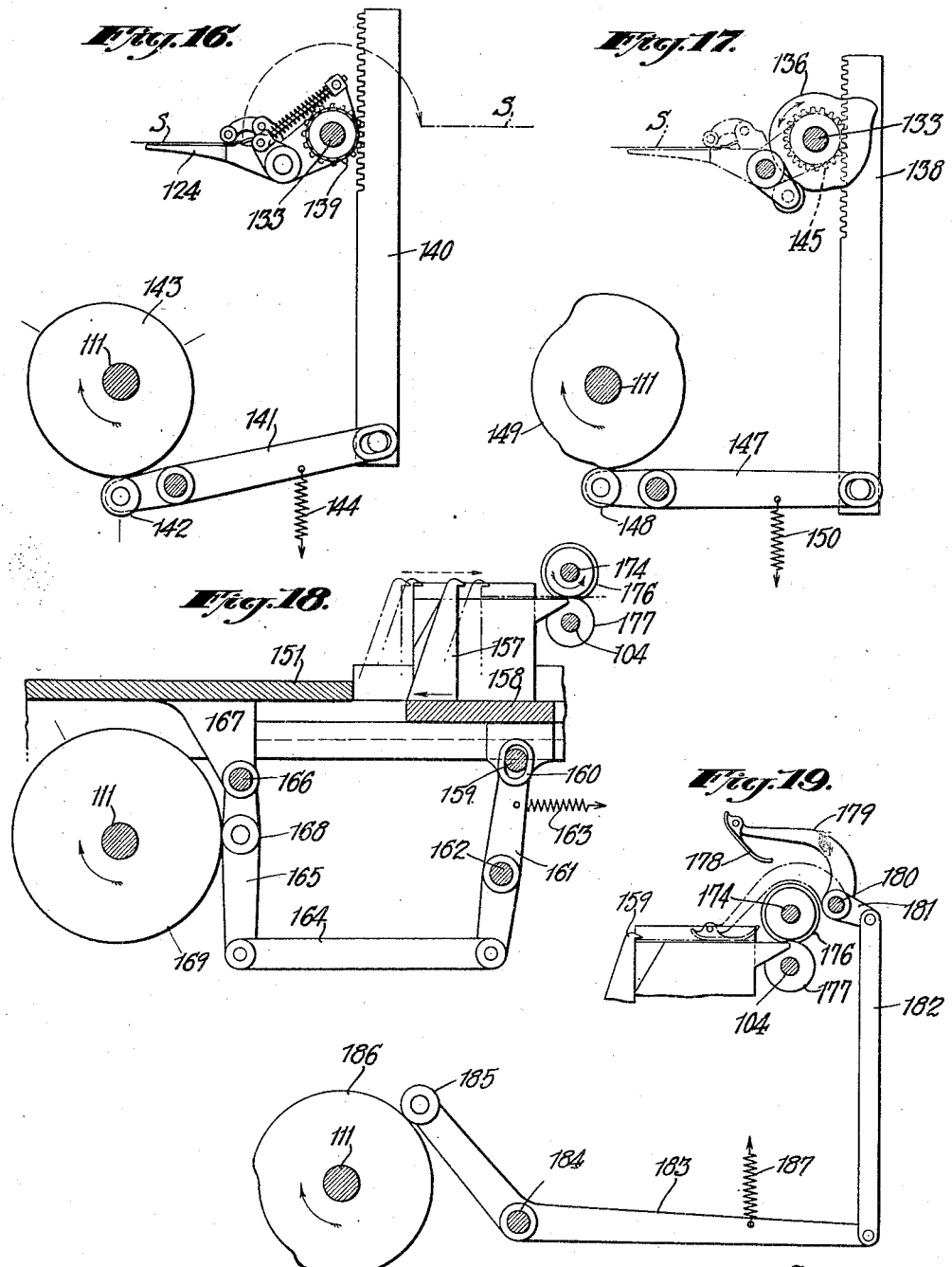

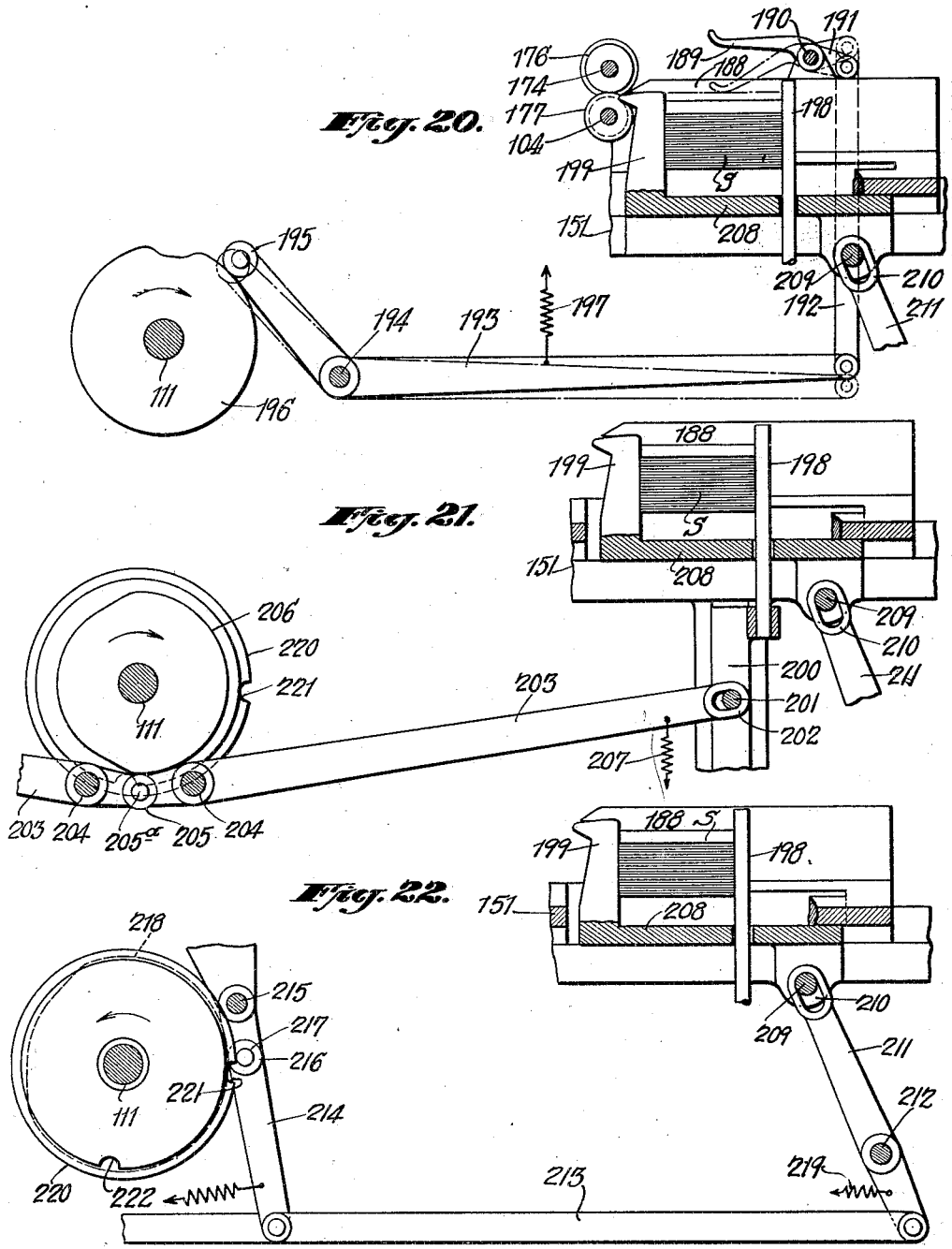

March 22, 1932. C. R. KADDELAND 1,850,720
SLITTING AND COLLECTING MECHANISM
Filed April 5, 1929 12 Sheets-Sheet 11
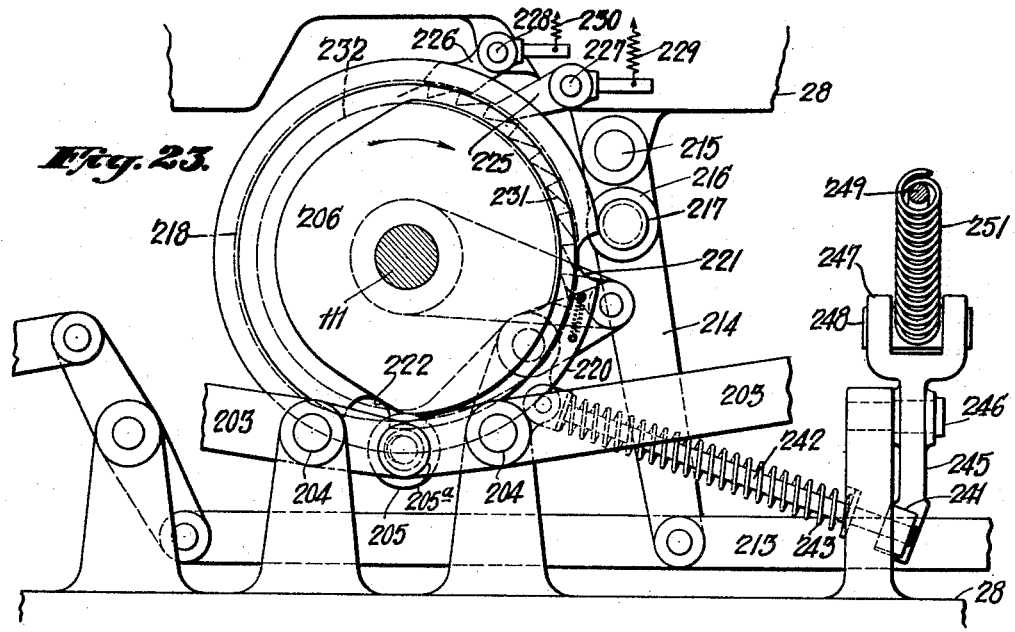
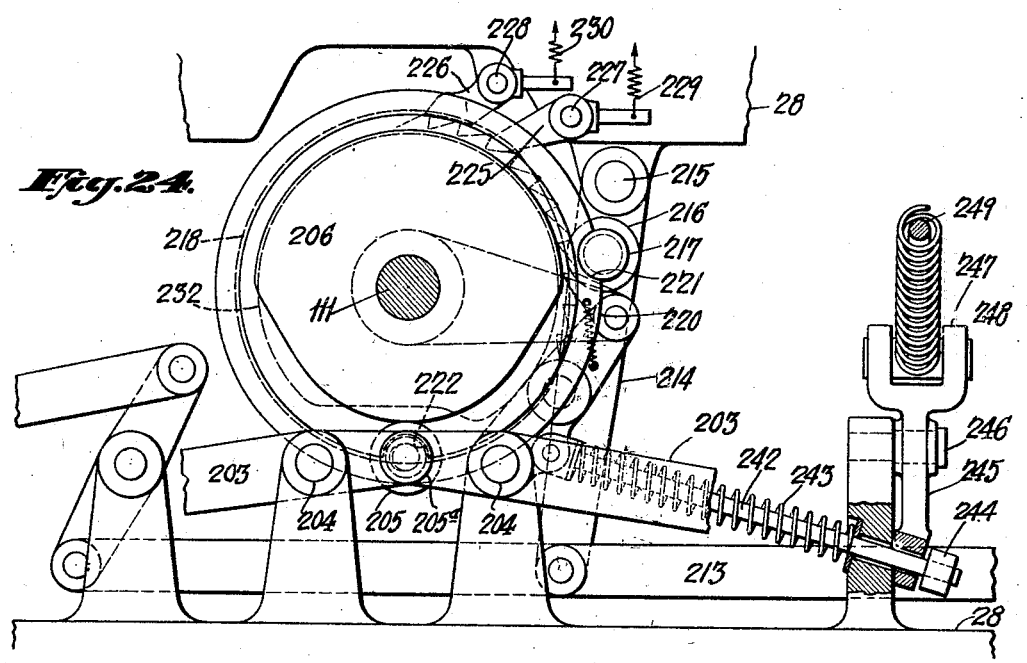
Inventor
CHRISTEN R. KADDELAND.
By His Attorney
Philip C. Peck March 22, 1932.   C. R. KADDELAND   1,850,720
SLITTING AND COLLECTING MECHANISM
Filed April 5, 1929   12 Sheets-Sheet 12
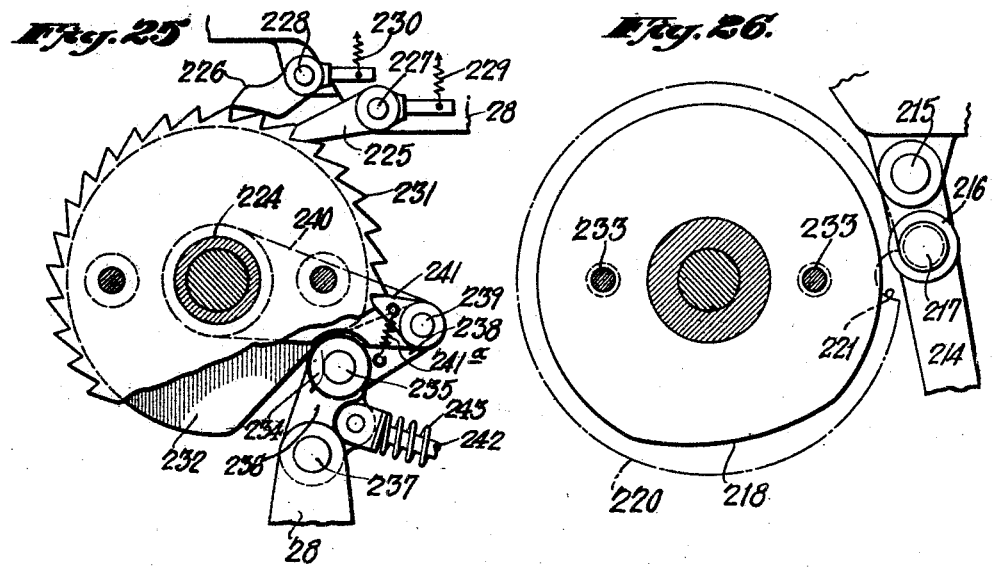
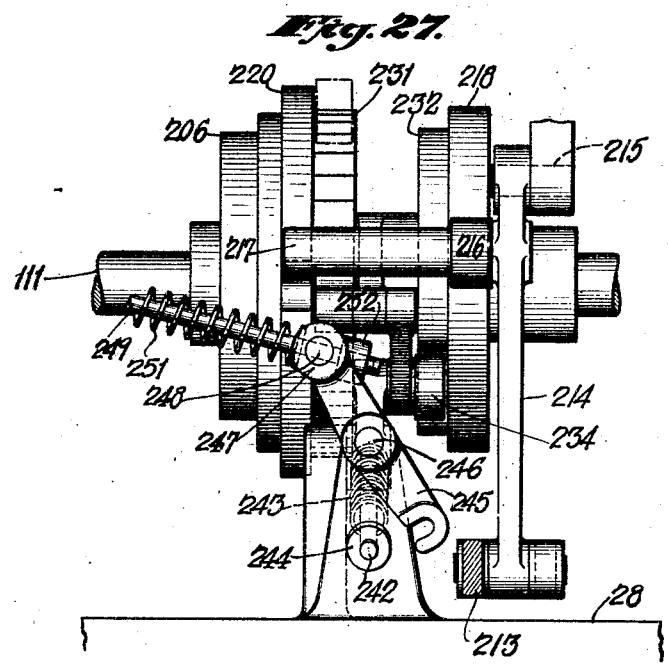
Inventor
CHRISTEN R. KADDELAND.
By His Attorney
Philip B. Rich Patented Mar. 22, 1932

1,850,720

UNITED STATES PATENT OFFICE

CHRISTEN R. KADDELAND, OF SHELTON, CONNECTICUT, ASSIGNOR TO HARRIS-SEYBOLD-POTTER COMPANY, OF CLEVELAND, OHIO, A CORPORATION OF DELAWARE

SLITTING AND COLLECTING MECHANISM

Application filed April 5, 1929. Serial No. 352,672.

My invention relates to certain improved devices used in conjunction with printing-presses for accurately slitting sheets of paper after printing, and thereafter collecting the slitted products in predetermined sequence as well as for delivering such collected products so slitted in predetermined amounts in proper receptacles or containers.

Heretofore in printing and collecting machines of this character, it has been customary to slit the printed sheet in one direction only either by passing the printed sheet through the cutting or slitting devices so as to slit such sheet in the normal direction of its travel, or by delivering the printed sheet to a secondary sheet-registering table where the sheet is first positioned in proper relation to the slitting devices and then is forwarded into the slitters at right angles to the original direction of sheet travel as delivered on the sheet-registering table. Such machines are limited therefore to slitting the sheet in one direction only after printing.

The objects of my invention are, among other things, to provide novel and improved mechanisms used in connection with the printing-press whereby the sheets after printing will be successively slit in two directions, parallel as well as at right angles to the normal direction of sheet travel in accurate registration with the printing on such sheet. In my improved machine both slitting operations are automatically performed after the printing elements have completed the printing on the sheet.

According to my invention the sheets are first completely printed before passing to the slitting devices, and then are collected and held by mechanically actuated grippers throughout the slitting operation which is parallel with the normal direction of sheet travel through the press. Such grippers are embodied in the slitting devices and are adapted to seize and secure the printed sheet to the primary slitting device before the usual grippers on the printing element (in the present embodiment the impression-cylinder) release such sheet.

A further feature of my invention is the provision of novel means for advancing the slit or divided sheet to a pair of oppositely-disposed turning mechanisms whereby the forward travel of such divided portions of the sheet is first arrested and then separated, after which such slit portions are reversed or turned over and delivered to a pair of oppositely-disposed sheet-registering tables and then passed through pairs of slitting devices which cut the registered divided portions at right angles to the line of division made in the first slitting operation. The finished product, after the slitting operations in the two directions hereinbefore referred to, is thereafter delivered into separate individual pockets and there accumulated and delivered from such pockets in predetermined quantities without interrupting the normal operation of the printing-press.

A further feature is to provide means for interlocking the product counting devices which govern the accumulation of finished product sheets in the pockets with the usual automatically controlled mechanism for throwing off and on the impression so that the counting action will stop when the printing relation of the printing couple is broken for any reason, and will be restored after the printing relation is reestablished in the press.

Further objects and advantages will appear hereinafter and be particularly pointed out in the claims, and the drawings show a preferred embodiment of my invention in conjunction with a two-color rotary printing-press, but my improvements are not necessarily restricted to any particular form or type of printing-press construction.

In the drawings, Fig. 1 is a diagrammatic side elevation of a two couple press adapted for printing twice upon the same sides of the sheet in which figure certain parts shown in other views in detail are omitted;

Fig. 2 is an enlarged fragmentary plan view showing certain parts for the primary slitting operation;

Fig. 3 is an enlarged fragmentary plan view of one of the secondary slitting and collecting devices;

Fig. 4 is a section taken on the line 4—4 of Fig. 2;

Fig. 5 is a detail section taken on the line 5—5 of Fig. 2;

Fig. 6 is a detail section taken on the line 6—6 of Fig. 2;

Fig. 7 is an enlarged section taken on the line 7—7 of Fig. 3;

Fig. 8 is an enlarged section taken on the line 8—8 of Fig. 7;

Figs. 9 and 10 are diagrammatic sectional views showing the printed sheet in different stages of the primary slitting operation;

Fig. 11 is a diagrammatic sectional view showing devices for laterally registering the sheet after the primary slitting operation;

Figs. 12 to 15 inclusive are enlarged detail sectional views showing the positions of the several sheet-controlling devices during the travel of the divided portions of the sheet after the first slitting operation to the delivery of such sheet portion on one of the secondary registering tables;

Figs. 16 to 22 inclusive are detail sections taken along their respective numbered lines shown in Fig. 8;

Figs. 23 and 24 are sectional views both taken on the line 23—23 of Fig. 8 showing the devices for actuating the product-counting mechanism but in different positions;

Figs. 25 and 26 are detail sections taken on the lines 25—25 and 26—26 respectively shown in Fig. 8; and Fig. 27 is a detail end elevation of the product-counting mechanisms also shown in section in Figs. 25 and 26.

Similar numerals refer to similar parts throughout the various figures.

Referring to Fig. 1, the main frame 28 of the press supports the piled sheets of paper 29 and the usual sheet separators (not shown) will separate and advance the successive sheets S from the paper pile 29 down the feed-board 30 to the sheet gauges 31 where the sheets are seized by the grippers 32 of the impression-cylinder 33 of the press (Figs. 2 and 4).

The impression-cylinder 33 is journalled in the press frame 28 and coacts with the upper form cylinder 34 and lower form cylinder 35, each equipped with the usual inking devices as shown in Fig. 1. The two form cylinders 34 and 35 are each journalled in eccentric bearings 36 which are adapted to turn in the press frame 28 to make or break the printing relation between the two form cylinders 34 and 35 and their common impression cylinder 33. The eccentric bearings 36 are operated from the rock-shaft 37, double-ended levers 38, and adjustable toggle connections 39 in the usual way to throw off or restore the impression in the two printing couples.

The printing-press is driven by the motor 40 and belt 41 which passes around the pulley 42 on the drive shaft 43 journalled in the press frame 28. The drive shaft 43 carries the pinion gear 44 which drives the intermediate gear 45 and pinion 46 which meshes with the gear 47 fast to the lower form cylinder 35; the gear 47 meshes with the gear 48 secured to the impression cylinder 33. Meshing with the gear 48 is the gear 49 of the primary slitting cylinder 50 (Figs. 1, 4 and 6) which is made one-half the diameter of the impression cylinder gear 48 thereby causing the slitting cylinder 50 to rotate two revolutions to one of the impression cylinder 33.

The slitting cylinder 50, as shown in Figs. 2 and 4, comprises the central shaft 51 journalled in the press-frame 28 and a series of spaced-apart slitter disks 52 mounted on the shaft 51 with a series slitter grippers 53 arranged between the disks 52 which grippers 53 coact with gripper pads 54 carried by the disks 52 whereby the sheet S is held and controlled during the primary slitting operation. The grippers 53 are carried on the transverse bar 55 journalled in the disks 52, and the bar 55 is provided at one end with the lever 56 to which is pinned the cam-roller 57 which coacts with the cam 58 to control the opening and closing of the slitter grippers 53.

The slitter gripper cam 58 is loosely mounted on the shaft 51, but is rotatively fastened to the gear 59 journalled on the shaft 51 (Figs. 2 and 5). The gear 59 meshes with the idler gear 60 which in turn meshes with the small driving pinion 61 secured to the large gear 62 which is driven by the drive gear 63 fastened to one end of the impression cylinder 33. The gears 60, 61 and 62 are journalled on suitable studs fastened to the press frame 28, and are proportioned to rotate the slitter gripper cam 58 at one-half revolution to one of the slitting cylinder 50 which revolves at the same peripheral speed as the impression cylinder 33 but in the opposite direction (Fig. 4).

The rotary slitter knife 64 is adapted to coact with one of the slitter disks 52, and is mounted on the collar 65 secured to the cross-shaft 66 journalled in the press-frame 28 (Figs. 2 and 4). The shaft 66 carries the gear 67 which is driven by the coacting drive slitter cylinder gear 49 (Figs. 2 and 6).

Above the slitting cylinder 50, the sheet propelling wheel shaft 68 is journalled in the sliding blocks 69 held within the frame 28 (Fig. 4), on which shaft 68 is mounted a series of propelling wheels 70 (Figs. 2, 9 and 10), which hold the sheet S against the cylinder 50. The blocks 69 are provided with pressure coil springs 71 to maintain a yielding frictional contact between the wheels 70 and slitter disks 52 to advance the slit sheet from the cylinder 50 over the stripper fingers 72 into the bite of the feed rollers which further advance the sheet.

The stripper fingers 72 in spaced-apart relation (Fig. 2) are mounted on the cross-shaft 73 journalled in the press-frame 28.

and are oscillated in suitable timed relation with the slitter cylinder 50 by the lever 74 pivotally connected to the rod 75 pinned to the rocking cam-lever 76 fulcrumed on the stub 77 fastened to the press-frame 28 (Fig. 10). The lever 76 carries the cam-roller 78 which coacts with the cam 79 fastened to the impression cylinder 33. The spring 80 holds the roller 78 in contact with the cam 79.

The upper feed roller 81 and the lower feed roller 82 for advancing the sheet S after slitting are mounted on cross shafts 83 and 84 respectively which are journalled in the press frame 28 (Figs. 2, 4, 9–11). The shaft 84 carries the gear 85 which meshes with the slitter gear 67 and also with the gear 86 mounted on the upper cross-shaft 83 (Fig. 6). The gear 87 meshes with the gear 86 and drives the gear 88 mounted on the shaft 89 carrying a pulley 90 around which passes the sheet hold down belt 91 which also passes around the idler pulley 92 (Figs. 2 and 4).

As shown the slitting line of division of the sheet in the primary slitting mechanism is subjacent to the lower run of the belt 91 which thereby holds the contiguous slit edges of the sheet S in parallelism as the sheet is advanced forwardly by the feed rollers 81 and 82.

Referring more particularly to Figs. 4 and 11, the bell crank lever 93 is pivotally mounted on the stripper finger shaft 73, and has a toothed segment 94 which is oscillated through the pivoted link 95 connecting the lever 93 with the bell crank lever 96 carrying the cam roller 97 which engages with the cam 98 secured to the impression cylinder 33 through the pull spring 98ª. The oscillating movement of the segment 94 is transmitted to the sheet jogger shaft 99 through the pinion 100 fastened to the shaft 99 which is journalled in the press frame 28. A pair of oscillating jogger fingers 101 (Fig. 2) are mounted on the shaft 99 and engage the tail ends of the slit sheet after it has been advanced under the belt 91 by the pairs of feed rollers 81 and 82 as shown in Fig. 4.

Fastened to the ends of the shaft 84 (Figs. 1 and 2) are two mitre gears 102 which are complements of each other and mesh with two mitre gears 103 (also complements of each other), but located on opposite sides of the machine to drive the secondary sheet propelling shafts 104 journalled in press frame 28. Meshing with the slitter cylinder gear 49 is the intermediate gear 105 (Figs. 1 and 6) mounted on the stud 106 fastened to the press frame 28. The gear 105 meshes with the gear 107 secured to the shaft 108 (Fig. 8) also journalled in the frame 28, which shaft 108 carries the mitre gear 109 meshing with the mitre gear 110 mounted on the rear end of the main cam shaft 111 journalled longitudinally of the machine in the press frame 28. The diameter of the driving gear 107 is so proportioned that this cam shaft 111 will rotate at exactly the same speed as the impression cylinder 33.

The primary receiving table 112 for the longitudinally slit sheet S is secured to the press frame 28 beneath the belt 91 (Figs. 4 and 12), and takes the divided sheet after the primary slitting operation. The sheet stops 113 are adjustably secured at the forward end of the table 112 (Fig. 2) against which stops the slitted portions of the sheet S are positioned longitudinally of the machine by the oscillating jogger fingers 101.

The mechanisms for positioning and registering the slitted portions of the sheet after alinement against the stops 113 in relation to the secondary slitting devices as well as those devices for accumulating and counting the finished products are complements of each other, and are arranged on opposite sides of the machine with the table 112 located therebetween. Hence a description of only one set of these mechanisms will be sufficient for a clear understanding of their structure and operation.

Referring to Figs. 2 and 12–14, the sheet registering wheels 114 are fastened to and rotate with the shaft 104. Above the sheet S are the intermittently coacting pressure rollers 115 pinned to the studs 116 carried by the arms 117 which are pivotally mounted on the holders 118 by the fulcrum pin 119. The arms 117 carry the projecting lugs 120 abutting against the stop lugs 121 on the holders 118 which lugs limit the movement of the arms 117 in one direction (Figs. 12 and 13). The holders 118 carrying the pressure springs 122 which bear on the lugs 120 are secured to and are oscillated by the fly gripper shaft 123 journalled in the oscillating fly fingers 124 extending inwardly beneath the slitted portions of the sheet S (Figs. 2 and 12). The fly grippers 125 are fastened to the shaft 123 and coact with the lugs 126 on the fly fingers 124 (Figs. 13 and 14) to hold the outer margin of the slit sheet for the reversing movement.

The fly gripper shaft 123 is oscillated with respect to the fly fingers 124 by the levers 127 and 128 fastened to opposite ends of the shaft 123 (Fig. 2), and the levers 127 and 128 are provided with pressure springs 129 coiled about the rods 130 passing loosely through the lugs 131 against which the outer ends of the springs bear. The lugs 131 are pinned to the arms 132 on the fly finger arms 124ª loosely journalled on the oscillating fly shaft 133 which is journalled in the frame 28 as shown in Figs. 2 and 12. The lever 128 carries the short arm 134 to which is pinned the cam roller 135 which coacts with the oscillating cam 136 journalled on the shaft 133, the cam 136 carrying the pinion 137 actuated by the vertically reciprocating rack 138. The fly shaft 133 carrying the fly fingers 124 is oscillated by the pinion 139 and reciprocating rack 140 slidably supported in the press frame 28, which rack is actuated by the cam lever 141 (Fig. 16) pinned to the frame. The lever 141 carries the cam roller 142 which rides on the cam 143 mounted on the constantly rotating cam shaft 111. Contact between the roller 142 and cam 143 is maintained by the tension spring 144, and through the reciprocating movements of the rack 140 the fly fingers 124 are caused to oscillate periodically approximately 180° (from Fig. 14 to Fig. 15 positions) to reverse the slitted portions of the sheet to bring their printed sides up for the secondary slitters.

The fly gripper shaft control cam 136 is secured to the pinion 145 which meshes with the reciprocating rack 138 suitably guided in the frame 28 (Figs. 2 and 17), and actuated by the cam lever 147 fulcrumed on the stud 148 fastened to the press frame. The short end of the lever 147 carries the cam roller 148 which rides on the cam 149 secured to the main cam shaft 111 through the tension of the spring 150 whereby periodical oscillations of the cam 136 independently of the oscillations of the fly shaft 133 are obtained.

Supported on the press frame 28 (Fig. 3) is the secondary slitter registering table 151 on which is adjustably fastened the side guide plate 152 by the set screws 153. The rock shaft 154 (Figs. 3 and 4) is journalled in the frame 28, and carries the oscillating push finger 155 opposite the plate 152 to register the sheet S against this plate. The shaft 154 is provided with the actuating pinion 156 that meshes with the oscillating pinion 100 (Figs. 4 and 11), whereby the push finger 155 is periodically oscillated to side-register the sheet.

Slidably guided in the frame 28 (Fig. 7) are the pusher fingers 157 mounted on the sliding plate 158 which carries the pin 159 engaging the slotted end 160 of the rock lever 161 fulcrumed on the stud 162 and the lever 161 is provided with the tension spring 163. The lower end of the lever 161 (Fig. 18) is connected by the link 164 with the lower end of the cam lever 165 fulcrumed on the stud 166 secured to the bracket 167 which lever 165 carries the cam roller 168 that rides on the cam 169 mounted on the main cam shaft 111.

The cross-shaft 66 (Fig. 3) carries the bevel pinion 102 meshing with the bevel gear 103 keyed to the lower secondary slitter shaft 104 journalled in the frame 151. The spur gear 172 fastened to the shaft 104 meshes with the gear 173 fastened to the upper secondary slitter shaft 174 on which are mounted the adjustable collars 175 carrying the circular slitter knives 176 that coact with the lower slitter wheels 177 mounted on the shaft 171 as shown in Fig. 7.

Referring to Figs. 3, 7 and 19, the paper friction shoes 178 (three being shown in Fig. 3) are pivotally mounted on the arms 179 secured to the rock shaft 180 journalled in the press frame 28. One end of the shaft 180 carries the rock lever 181 to which is pinned the link 182 pivotally connected to the cam lever 183 fulcrumed on the frame stud 184.

The inner end of the cam lever 183 carries the cam roller 185 which rides on the cam 186 secured to the main cam shaft 111 through the tension of the spring 187, whereby the friction shoes 178 have an up and down movement as shown in dotted lines in Figs. 7 and 19.

Outside the slitter knives 176 are a series of angular accumulating pockets 188 (six being shown in Figs. 1 and 3) formed in the press frame 28. Over these pockets 188 are arranged a like number of oscillating packer fingers 189 (Figs. 3 and 7), which are mounted on the rock shaft 190 journalled in the press frame; at one end the shaft 190 is provided with the rock arm 191 to which is pinned the link 192 pivotally connected to the cam lever 193 fulcrumed on the frame stud 194 (Fig. 20). The inner end of the cam lever 193 carries the cam roller 195 which rides on the cam 196 secured to the main cam shaft 111 through the tension of the spring 197, whereby the packer fingers 189 are raised and lowered in unison as shown in dotted lines in Figs. 7 and 20 to pack the accumulating finished product in the pockets 188.

Referring to Figs. 3, 7, 20–22, the stop pins 198 and pusher fingers 199 form the ends of the pockets 188 into which the finished product is delivered by the secondary slitters 176 and 177 and packed by the fingers 189. The stop pin 198 is fastened to the vertical slide 200 slidably mounted in the press frame and the slide 200 is provided with the pin 201 engaged by the slotted end 202 of the cam lever 203 fulcrumed on the frame stud 204 (Fig. 21). The lever 203 carries the cam roller 205 and stud 205ª which roller 205 coacts with the cam 206 fastened to the main cam shaft 111 through the tension of the spring 207.

The pusher fingers 199 are parts of the slide 208 horizontally movable in the press frame 28, which slide 208 carries the pin 209 engaged by the slotted end 210 of the rock lever 211 fulcrumed on the frame stud 212. The lower end of the lever 211 is pivotally connected by the link 213 to the cam lever 214 fulcrumed on the stud 215 (Fig. 22), and carries the cam roller 216 having the projecting stud 217 which roller 216 is adapted to engage the cam 218 secured to the main cam shaft 111 through the tension of the spring 219.

Referring more particularly to Figs. 21–23, the product counting disk 220 is formed with the notch 221 adapted to periodically engage with the stud 217 and so permit the engagement of the cam roller 216 with the cam 218. A second notch 222 is cut in the disk 220 so proportioned relatively to the notch 221 as to engage the cam roller stud 205ª at the same time the notch 221 engages with the stud 217 and thereby permit the cam roller 205 to engage the cam 206 to withdraw the stop pin 198 from in front of the product pile before the pusher fingers 199 move outwardly in the direction of the arrow (Fig. 22) through the coaction of the cam roller 216 riding on the cam 218.

Referring to Figs. 23-27, the stop disk 220 is loosely mounted on the sleeve 224 carried by the main cam shaft 111 (Fig. 8), and is normally held from rotating by the stop pawl 225 and brake shoe 226 mounted on the frame studs 227 and 228 respectively. The stop pawl 225 is provided with the tension spring 229, and the brake shoe 226 has the tension spring 230, both springs being fastened to the press frame 28 (Fig. 7). Secured by bolts to the stop disk 220 is the ratchet wheel 231 having the same number of teeth as the number of slitted products it is intended to accumulate in each of the angular pockets 188. Secured to the pusher finger cam 218 is the counter ratchet wheel actuating cam 232 which is fastened to the cam 218 by the rivets 233 (Fig. 23).

The cam 232 coacts with the roller 234 pinned to stud 235 on the cam lever 236 pivotally secured by the pin 237 to the press frame 28. Pivotally secured to the stud 235 is the link 238 which is connected by the pin 239 to the rock lever 240 fulcrumed on the sleeve 224. Pivotally mounted on the pin 239 is the ratchet pawl 241 held in contact with the ratchet wheel 231 by the spring 241ª. Pinned to the lever 236 is the spring rod 242 having the compression spring 243 thrusting against the press frame 28 and also carrying on its outer end the fixed collar 244 adapted to engage the counter trip lever 245 whereby the movement of the pawl 241 may be tripped and the motion of the counter disk 223 may be consequently interrupted. The trip lever 245 (Fig. 27) is fulcrumed on the stud 246 fastened to the press frame 28, and its upper forked end 247 (Figs. 8 and 24) carries the trunnion 248 through which the counter trip rod 249 passes and is connected by the pin 250 with the impression toggle lever 38. The rod 249 also is provided with the compression spring 251 and adjusting collar 252 on its lower end and with the fixed collar 253 (Fig. 8), whereby the product counting mechanism is automatically restored to operation when the printing relation is established between the impression cylinder 33 and the form cylinders 34 and 35 by the movement of the impression toggle lever 38.

The operation of my slitting and collecting mechanism is substantially as follows: The successive sheets S are separated and advanced from the pile 29 and conveyed to the usual grippers on the impression cylinder 33 by which the sheet is held and controlled while being printed through the coaction of the form cylinders 34 and 35 with the impression cylinder 33.

The impression cylinder grippers in the usual way release the sheet S after the slitting cylinder grippers 53 seize the sheet which is carried by the primary slitter knife 64 (Fig. 9) and to the delivery point between the slitter knife 64 and the propelling wheels 70 when the sheet is passed over the stripper fingers 72. However the slit sheet is not taken from the slitting cylinder 50 until the entire length of the sheet has been cut, the slitter cylinder grippers 53 releasing their hold (Fig. 10) on the second revolution of the cylinder 50 after the front edge of the sheet has been carried beneath the propelling wheels 70, but before such edge meets the stripper fingers 72.

The stripper fingers 72 are held from contacting with the slitting cylinder 50 (Figs. 9 and 11) during its first revolution but are moved into sheet stripping position (Fig. 10) by the action of the roller 78 riding into the low part of the cam 79. The sheet now divided throughout its length is advanced off the cylinder 50 by the wheels 70 over the stripper fingers 72 into the bite of the feed rollers 81 and 82 as shown by dotted lines in Fig. 10. The rollers 81 and 82 advance the sheet onto the primary sheet receiving table 112 where the over-guide belt 91 holds the slitted edges of the sheet down on the table 112 (Figs. 2 and 4).

The slit sheet is then positioned longitudinally on the table 112 against the forward stops 113 by the oscillating fingers 101 (Figs. 2 and 11), after which each slit portion is gripped between the wheels 114 and coacting rollers 115 and then separated and positioned sideways or laterally against the lugs 254 on the fly fingers 124 in which position the outer margin of the sheet is seized by the fly grippers 125 and 126. These parts are so proportioned that such side-positioning of the sheet will withdraw the slit edge of the sheet from beneath the belt 91 (Fig. 12).

The fly fingers 124 are thereafter turned from their Fig. 12 position to their Fig. 15 position by the mechanism shown more particularly in Figs. 12-15 and hereinbefore described whereby the slit sheet is reversed and delivered with its printed side up onto the secondary slitter registering table 151 (Figs. 3 and 15) after which the fly grippers 125 and 126 release the sheet. The various cams on the main cam shaft 111 are set to cause the operation of these devices in proper synchronism as described.

The sheet is then positioned laterally on the table 112 against the guide plate 152 by the push finger 155 (Fig. 3), and is thereafter engaged by the friction shoes 178 and the pusher fingers 157 which permit the fly fingers 124 to be swung back into their sheet-receiving position (Fig. 12), while the sheet itself is advanced by the pusher fingers 157 into contact with upper slitters 176 and lower slitters 177 (Figs. 3 and 7). The movement of the pusher fingers 157 is so arranged by adjusting the cams on the shaft 111 that the leading edge of the sheet when it reaches the slitters 176 and 177 is moving at the same rate as the peripheral speed of these slitters.

The slit finished product from the slitters 176 and 177 now passes outwardly into the accumulating pockets 188 where it is packed by the packer fingers 189, and then accumulated in predetermined amounts and delivered into the outer portion of the pockets 188 by the simultaneous withdrawal of the stop pins 198 and advancement of the pusher fingers 199 as hereinbefore described.

The operation of the product counting disk 220 in conjunction with joint movements of the stop pins 198 and pusher fingers 199 has been set forth, as well as the operation of the counter trip lever 245 to actuate the counter trip rod 249 connected with the toggle lever 38 to control the printing relation of the form cylinders 34 and 35 with the impression cylinder 33, whereby the functioning of the counting mechanism is automatically restored when the printing relation of the two printing couples is established.

My invention, in its broadest aspects, is not limited to the particular construction and arrangement of the various parts shown and described, as many changes may be made without departing from the main principles of the invention and without sacrificing the chief advantages derived from its use in slitting and collecting printed sheets in predetermined quantities as described.

I claim as my invention:

1. In a slitting mechanism, a rotary slitting cylinder for carrying the sheet, a coacting revolving cutter blade, said devices subdividing a sheet along the line of its travel, grippers on the cylinder for retaining control of the sheet throughout the slitting operation, means for opening said grippers during the second revolution of said cylinder, a combined stripper and guide, and means for moving said stripper into position for stripping the sheet from said cylinder as the grippers release the slit sheet.

2. In a slitting mechanism, a rotary slitting cylinder for carrying the sheet, a coacting revolving cutter blade, said devices subdividing a sheet along the line of its travel, grippers on the cylinder for retaining control of the sheet throughout the slitting operation, means for opening said grippers during the second revolution of said cylinder, means yieldingly holding the front edge of the sheet on said cylinder as said grippers open, a combined stripper and guide, and means for moving said stripper into position for stripping the sheet from said cylinder as the grippers release the slit sheet.

3. In a slitting mechanism, a rotary slitting cylinder for carrying the sheet, a coacting revolving cutter blade, grippers for retaining control of the sheet throughout the slitting operation, means for opening said grippers at the end of the second revolution of said cylinder, and means for holding the leading edge of the sheet on said cylinder as said grippers open.

4. In a slitting mechanism, a rotary slitting cylinder for carrying the sheet, a coacting revolving cutter blade, grippers for retaining control of the sheet throughout the slitting operation, means for opening said grippers at the end of the second revolution of said cylinder, and means comprising a yielding pressure roller for holding the leading edge of the sheet on said cylinder as said grippers open.

5. In a slitting mechanism, a rotary slitting cylinder for carrying the sheet, grippers on said cylinder to hold the sheet thereto, a rotary cutter blade coacting with said cylinder, and a gripper cam rotating at a speed different from the speed of said cylinder for opening said grippers to release the sheet during the second revolution of said cylinder.

6. In a slitting mechanism, coacting slitting members including a cylinder for subdividing a sheet in the direction of its travel, grippers on said cylinder to retain control of the sheet throughout the slitting operation, a combined stripper and guide, and means for moving said stripper into position for stripping the sheet from said cylinder when the grippers release the slit sheet on the second revolution of said cylinder.

7. In a slitting and collecting mechanism, coacting slitting members for subdividing a sheet into slitted portions in the direction of its travel and means for reversing said slit portions of the sheet by turning same upside down and delivering same substantially at right angles to their original line of travel.

8. In a slitting and collecting mechanism, coacting slitting members for subdividing a sheet in the direction of its travel, means for reversing the slit portions of the sheet by turning same substantially at right angles to their line of travel, and means for jogging and positioning said slit portions relatively to said sheet reversing means before turning.

9. In a slitting and collecting mechanism, coacting slitting members for subdividing a sheet in the direction of its travel, means for separating the slit portions of the sheet, means for reversing the slit portions of the sheet by turning same substantially at right angles to their line of travel, and means for jogging and positioning said slit portions in transverse directions relatively to said sheet reversing means before turning.

10. In a slitting and collecting mechanism, coacting slitting members for subdividing a sheet in the direction of its travel, means for reversing the slit portions of the sheet by turning same substantially at right angles to their line of travel, and means including coacting propelling rollers intermittently engaging said slit portions for jogging and positioning said slit portions in transverse directions relatively to said sheet reversing means before turning.

11. In a slitting mechanism, coacting slitting members for subdividing a sheet in the direction of its travel, means for registering both slit portions of the sheet laterally and longitudinally, and separate slitting mechanisms for subdividing said slit portions at right angles to the first line of travel.

12. In a slitting mechanism, coacting slitting members for subdividing a sheet in the direction of its travel, means for turning said slit portions upside down and separate slitting mechanisms for subdividing said turned slit portions at right angles to the first line of travel.

13. In a slitting and collecting mechanism, coacting slitting members for subdividing a sheet into slitted portions in the direction of its travel, a sheet reversing or turning mechanism for turning each of said slitted portions upside down comprising oscillatable fingers provided with sheet grippers to hold the slit portions of the sheet during the turning operation, and secondary slitters for sub-dividing said turned slit portions of the sheet.

14. In a slitting and collecting mechanism, coacting slitting members for subdividing a sheet into slitted portions in the direction of its travel, and a pair of oppositely disposed turning mechanisms for turning each of said slitted portions upside down comprising oscillatable fingers provided with grippers to take and hold the slit portions of the sheet during their turning operations, and secondary slitters for sub-dividing said turned slit portions of the sheet.

15. In a slitting and collecting mechanism, coacting slitting members for subdividing a sheet into slitted portions in the direction of its travel, a sheet reversing or turning mechanism for turning each of said slitted portions upside down comprising oscillatable fingers provided with sheet grippers to hold the slit portions of the sheet during the turning operation, means for positioning and holding said turned slit portions when said finger grippers release after said turning operation, and secondary slitters for sub-dividing said turned slit portions of the sheet.

16. In a slitting and collecting mechanism, coacting slitting members for subdividing a sheet in the direction of its travel, a turning mechanism for reversing the slit portions of the sheet, secondary slitters rotating at a uniform speed positioned at right angles to said primary sheet travel, and means for advancing the turned slit portions to the secondary slitters at substantially the same speed as said rotary slitters.

17. In a slitting and collecting mechanism, coacting slitting members for subdividing a sheet in the direction of its travel, a turning mechanism for reversing the slit portions of the sheet, secondary slitters rotating at a uniform speed positioned at right angles to said primary sheet travel, means for advancing the turned slit portions to the secondary slitters at substantially the same speed as said rotary slitters, means for packing the twice slit product from said rotary slitters in separate accumulating pockets, and counting means for delivering said product in predetermined quantities from said pockets.

CHRISTEN R. KADDELAND.